United States Patent
Li et al.

(10) Patent No.: US 12,094,030 B2
(45) Date of Patent: Sep. 17, 2024

(54) METHOD AND APPARATUS FOR RUNING A SERVICE, AND ELECTRONIC DEVICE

(71) Applicant: Lemon Inc., Grand Cayman (KY)

(72) Inventors: Zhichao Li, Los Angeles, CA (US); Sikai Qi, Beijing (CN); Zherui Liu, Beijing (CN); Yibo Zhu, Los Angeles, CA (US); Chuanxiong Guo, Los Angeles, CA (US); Cheng Tan, Los Angeles, CA (US); Jian Zhang, Los Angeles, CA (US); Jian Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/532,819

(22) Filed: Dec. 7, 2023

(65) Prior Publication Data

US 2024/0104687 A1 Mar. 28, 2024

Related U.S. Application Data

(63) Continuation of application No. PCT/SG2022/050601, filed on Aug. 23, 2022.

(30) Foreign Application Priority Data

Sep. 16, 2021 (CN) .......................... 202111088174.4

(51) Int. Cl.
 *G06T 1/20* (2006.01)
(52) U.S. Cl.
 CPC ...................... *G06T 1/20* (2013.01)
(58) Field of Classification Search
 CPC ....................................................... G06T 1/20
 See application file for complete search history.

(56) References Cited

U.S. PATENT DOCUMENTS

2020/0043123 A1 2/2020 Dash et al.

FOREIGN PATENT DOCUMENTS

| CN | 103279332 A | 9/2013 |
|---|---|---|
| CN | 110227259 A | 9/2019 |
| CN | 111489279 A | 8/2020 |
| CN | 111552550 A | 8/2020 |
| CN | 111580974 A | 8/2020 |

OTHER PUBLICATIONS

China National Intellectual Property Administration, Office Action and Search Report Issued in Application No. 202111088174.4, May 29, 2023, 9 pages.
China National Intellectual Property Administration, International Search Report Issued in Application No. PCT/SG2022/050601, Mar. 27, 2023, WIPO, 3 pages.

*Primary Examiner* — Matthew Salvucci
(74) *Attorney, Agent, or Firm* — Alleman Hall & Tuttle LLP

(57) ABSTRACT

Embodiments of the disclosure provide a method and apparatus for running a service, and an electronic device. An embodiment of the method includes: determining a target deployment manner of a graphics processing unit (GPU) according to performance data of each service in a service set, where the deployment manner includes: dividing the GPU into sub-GPUs of a respective size and determining a service configured to be run by each sub-GPU; and switching, for the service in the service set, running of the service from a sub-GPU indicated by a current deployment manner to a sub-GPU indicated by the target deployment manner. According to the embodiment, waste of the GPU can be reduced by running a plurality of services on the GPU.

19 Claims, 9 Drawing Sheets

METHOD AND APPARATUS FOR RUNING A SERVICE, AND ELECTRONIC DEVICE

CROSS-REFERENCE TO RELATED APPLICATION(S)

The disclosure is a Continuation application of International Patent Application No. PCT/SG2022/050601, which claims priority to Chinese Patent Application No. 202111088174.4 filed on Sep. 16, 2021, and entitled "Method and apparatus for running service, and electronic device", the disclosures of which are incorporated herein in their entireties by reference.

FIELD

Embodiments of the disclosure relate to the technical field of computers, in particular to a method and apparatus for running a service, and an electronic device.

BACKGROUND

In some scenarios, a graphics processing unit (GPU) is frequently used to run services, and waste of the GPU can be reduced through rational use of the GPU.

In the related art, the GPU is randomly divided into a plurality of sub-GPUs, and then corresponding services are run on the sub-GPUs.

SUMMARY

The summary of the disclosure is provided for introduction of concepts in a simplified form, and the concepts will be described in detail in the detailed description below. The summary of the disclosure is neither intended to denote key features or necessary features of the claimed technical solution, nor intended to limit the scope of the claimed technical solution.

Embodiments of the disclosure provide a method and apparatus for running a service, and an electronic device, by which, waste of a graphics processing unit (GPU) can be reduced by running a plurality of services on the GPU.

In a first aspect, an embodiment of the disclosure provides a method for running a service. The method includes: determining a target deployment manner of a GPU according to performance data of each service in a service set, where the deployment manner includes: dividing the GPU into sub-GPUs of a respective size and determining a service configured to be run by each sub-GPU; and switching, for the service in the service set, running of the service from a sub-GPU indicated by a current deployment manner to a sub-GPU indicated by the target deployment manner.

In a second aspect, an embodiment of the disclosure provides an apparatus for running a service. The apparatus includes: a determination unit configured to determine a target deployment manner of a graphics processing unit (GPU) according to performance data of each service in a service set, where the deployment manner includes: dividing the GPU into sub-GPUs of a respective size and determining a service configured to be run by each sub-GPU; and a switch unit configured to switch, for the service in the service set, running of the service from a sub-GPU indicated by a current deployment manner to a sub-GPU indicated by the target deployment manner.

In a third aspect, an embodiment of the disclosure provides an electronic device. The electronic device includes: one or more processors; and a storage means configured to store one or more programs, the one or more processors, when the one or more programs are executed by the one or more processors, implement the method for running a service according to the first aspect.

In a fourth aspect, the embodiment of the disclosure provides a computer-readable medium storing a computer program, the program, when executed by a processor, implements steps of the method for running a service according to the first aspect.

According to the method and apparatus for running a service, and the electronic device provided by the embodiments of the disclosure, the target deployment manner of the GPU is reasonably determined according to the performance data of each service in the service set, and the service in the service set can be further run by reasonably using the GPU. As a result, waste of the GPU can be reduced by running a plurality of services on the GPU.

BRIEF DESCRIPTION OF THE DRAWINGS

The above and other features, advantages and aspects of embodiments of the disclosure will become more apparent with reference to accompanying drawings and in conjunction with the following specific embodiments. Throughout the accompanying drawings, the same or similar reference numerals indicate the same or similar elements. It should be understood that the accompanying drawings are schematic and components and elements are not necessarily drawn to scale.

DETAILED DESCRIPTION OF EMBODIMENTS

Embodiments of the disclosure will be described below in more detail with reference to accompanying drawings. Although some embodiments of the disclosure are shown in the accompanying drawings, it should be understood that the disclosure can be implemented in various forms and should not be constructed to be limited to the embodiments set forth herein, and on the contrary, these embodiments are provided for facilitating more thorough and complete understanding of the disclosure. It should be understood that the accompanying drawings and the embodiments of the disclosure are merely used for illustration rather than limitation to the protection scope of the disclosure.

It should be understood that steps described in a method embodiment of the disclosure can be executed in different orders and/or in parallel. Further, the method embodiment can include an additional step and/or omit a shown step, which does not limit the scope of the disclosure.

As used herein, the terms "comprise" and "include" and their variations are open-ended, that is, "comprising but not limited to" and "including but not limited to". The term "based on" indicates "at least partially based on". The term "an embodiment" indicates "at least one embodiment". The term "another embodiment" indicates "at least one another embodiment". The term "some embodiments" indicates "at least some embodiments". Related definitions of other terms will be given in the following description.

It should be noted that concepts such as "first" and "second" mentioned in the disclosure are merely used to distinguish different apparatuses, modules or units, rather than limit an order or interdependence of functions executed by these apparatuses, modules or units.

It should be noted that modifications with "a", "an" and "plurality of" mentioned in the disclosure are schematic rather than limitative, and should be understood by those skilled in the art as "one or more" unless otherwise definitely indicated in the context.

Names of messages or information exchanged among a plurality of apparatuses in the embodiment of the disclosure are merely used for illustration rather than limitation to the scope of the messages or information.

Figure 1:
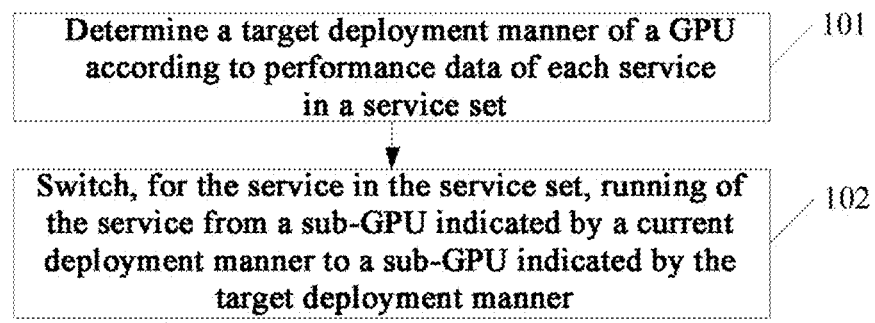
FIG. 1 is a flowchart of a method for running a service according to some embodiments of the disclosure.

With reference to FIG. 1, a flowchart of a method for running a service according to some embodiments of the disclosure is shown. As shown in FIG. 1, the method for running a service includes:

Step 101: A target deployment manner of a graphics processing unit (GPU) is determined according to performance data of each service in a service set.

In this embodiment, an execution subject of the method for running a service may determine the target deployment manner of the GPU according to the performance data of each service in the service set.

The service in the service set may be run on at least one GPU. In some scenarios, the service in the service set may a service provided by using a neural network model. For example, the neural network model may include a speech synthesis model, a speech recognition model, a character recognition model, etc.

The performance data may be data that represent a performance of the service.

Figure 2:
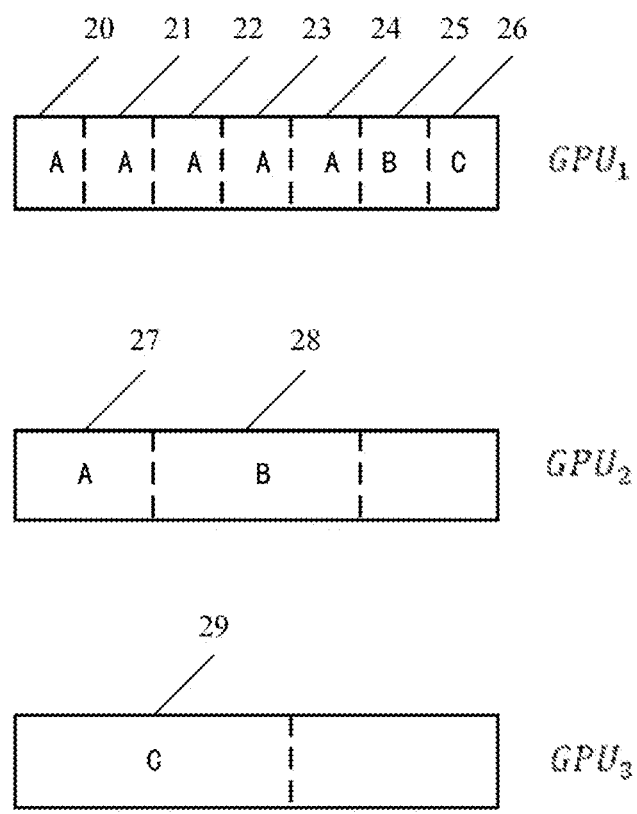
FIG. 2 is a schematic diagram showing a deployment manner of a method for running a service according to some embodiments of the disclosure.

The deployment manner includes: dividing the GPU into sub-GPUs of a respective size and determining a service configured to be run by each sub-GPU. For example, the service set includes services A, B and C. The service in the service set may be run on $GPU_1$, $GPU_2$ and $GPU_3$. In a deployment manner shown in FIG. 2, $GPU_1$ is divided into sub-GPUs 20-26 of sizes each equaling ⅐GPU, the sub-GPUs 20-24 are configured to run service A, the sub-GPU 25 is configured to run service B, and the sub-GPU 26 is configured to run service C. Then, $GPU_2$ is divided into a sub-GPU 27 of a size equaling ⅖GPU and a sub-GPU 28 of a size equaling ⅗GPU. The sub-GPU 27 is configured to run service A and the sub-GPU 28 is configured to run service B. Then, $GPU_3$ is divided into sub-GPUs 29 of a size equaling 4/7GPU, and the sub-GPU 29 is configured to run service C.

It may be understood that one sub-GPU is configured to run one service. The same service may be run on at least one sub-GPU.

Step 102: Running of the service is switched, for the service in the service set, from a sub-GPU indicated by a current deployment manner to a sub-GPU indicated by the target deployment manner.

In this embodiment, the execution subject may switch, for the service in the service set, running of the service from the sub-GPU indicated by the current deployment manner to the sub-GPU indicated by the target deployment manner.

It can be understood that after the sub-GPU running the service is switched, the service in the service set can be run in the target deployment manner.

It can be seen therefrom that according to this embodiment, the target deployment manner of the GPU is reasonably determined according to the performance data of each service in the service set, and the service in the service set can be further reasonably run by using the GPU. As a result, waste of the GPU can be reduced by running a plurality of services on the GPU.

In some embodiments, the performance data of the service include actual performance data and target performance data.

The actual performance data include throughputs and delays that are achieved by the service run on sub-GPUs of different sizes. For example, the actual performance data includes throughputs and delays that are achieved by the service run on sub-GPUs of sizes equaling ⅐GPU to 7/7GPU. In general, when the service is run on a larger sub-GPU, a higher throughput is implemented and a shorter delay is achieved by the service.

The target performance data includes a target throughput and a target delay of the service.

In an actual application, the target throughput and the target delay of the service may change. For example, during a peak period of users, the target throughput and the target delay of the service increase, while the target throughput and the target delay of the service decrease during the remaining period.

In these embodiments, the target deployment manner of the GPU is determined by comprehensively considering an actual performance and a target performance of each service, and the service in the service set is switched to being run in the target deployment manner. As a result, waste of GPU can be reduced on the premise that the target performance of each service is satisfied.

Figure 3:
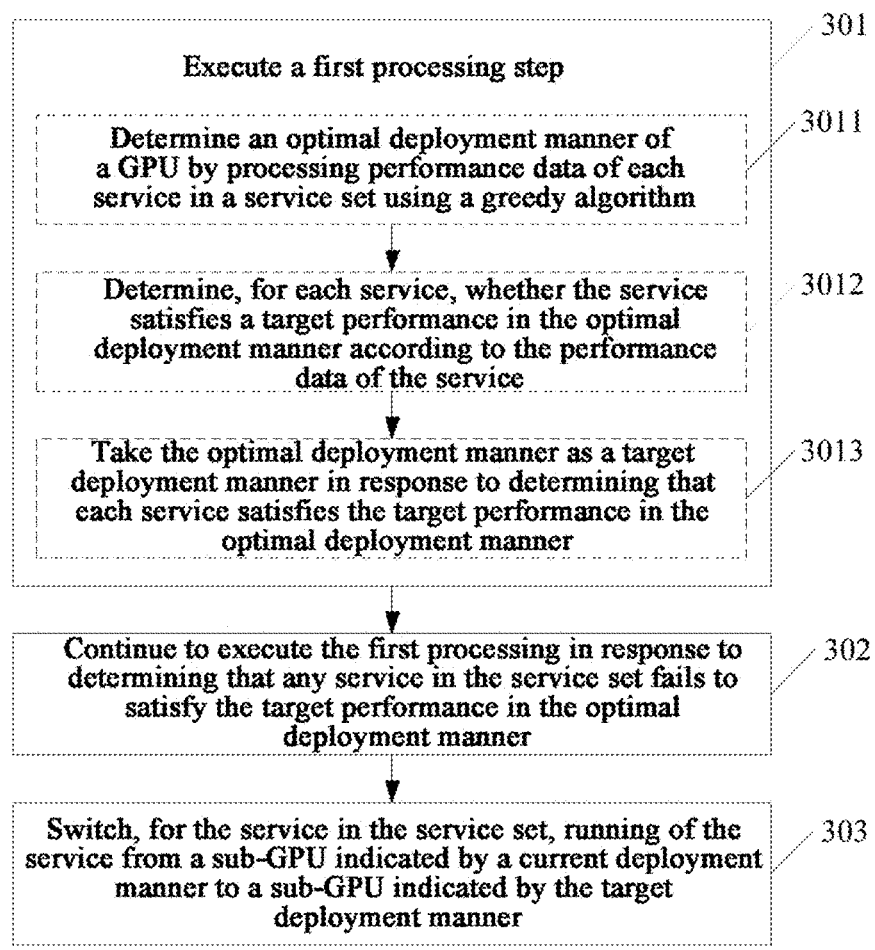
FIG. 3 is a flowchart of a method for running a service according to some embodiments of the disclosure.

With reference to FIG. 3, a flowchart of a method for running a service according to some embodiments of the disclosure is shown. As shown in FIG. 3, the method for running a service includes the following:

Step 301: A first processing step is executed.

In this embodiment, the execution subject of the method for running a service may execute the first processing step. The first processing step includes steps 3011-3013.

Step 3011: an optimal deployment manner of the GPU is determined by processing performance data of each service in a service set using a greedy algorithm.

The greedy algorithm can quickly determine the optimal deployment manner.

In some scenarios, the execution subject inputs the performance data of each service into the greedy algorithm to obtain the optimal deployment manner output by the greedy algorithm.

Step 3012: For each service, whether the service satisfies a target performance in the optimal deployment manner is determined according to the performance data of the service.

Step 3013: The optimal deployment manner is taken as a target deployment manner in response to determining that each service satisfies the target performance in the optimal deployment manner.

Step 302: The first processing step continues being executed in response to determining that any service in the service set fails to satisfy the target performance in the optimal deployment manner.

By processing the performance data of each service by using the greedy algorithm for many times, the target deployment manner in which the target performance of each service is satisfied may be determined.

Step 303: For the service in the service set, running of the service is switched from a sub-GPU indicated by a current deployment manner to a sub-GPU indicated by the target deployment manner.

Step 303 is similar to step 102 in the embodiment shown in FIG. 1, and will not be repeated herein.

In this embodiment, the target deployment manner in which the target performance of each service is satisfied may be determined within a short time by using the greedy algorithm. In view of that, each service may be switched, within a short time, to being run in the target deployment manner in which the target performance is satisfied.

In some embodiments, the execution subject may determine the optimal deployment manner of the GPU by using the greedy algorithm in the following manner.

Specifically, a batch of deployment manners of the GPU is determined by processing the performance data of each service in the service set, a score of each deployment manner is determined, and a deployment manner with the highest score is taken as the optimal deployment manner.

It may be seen that by using the greedy algorithm, a score of each deployment manner of the batch of deployment manners of the GPU is determined, so as to determine the optimal deployment manner, such that accuracy of determination of the optimal deployment manner can be improved.

In some embodiments, the execution subject may determine a score of each deployment manner of the batch of deployment manners of the GPU by using the greedy algorithm in the following manner.

Specifically, for each deployment manner, a scoring step is executed. The scoring step includes S1 to S2.

S1: For each service, a deployment completion rate and a contribution rate of the service are determined according to the actual performance data and the target performance data of the service.

The deployment completion rate denotes the ratio of a throughput in a certain deployment manner to a target throughput of the service. The contribution rate denotes the ratio of the throughput of the service in a certain deployment manner to a total target throughput of all services.

In some scenarios, the execution subject may determine sub-GPUs configured to run the service in a certain deployment manner. The execution subject may further determine throughputs that are achieved by the service run on all the sub-GPUs according to the actual performance data of the service. The execution subject may further determine a target throughput of the service according to the target performance data of the service. Further, the total throughput that is achieved by the service run on all the sub-GPUs may be taken as the throughput of the service in a certain deployment manner. As a result, the ratio of the throughput of the service in a certain deployment manner to the target throughput of the service may be taken as the deployment completion rate of the service. The ratio of the throughput of the service in a certain deployment manner to the total target throughput of all the services may be taken as the contribution rate of the service.

S2: The score of the deployment manner is determined according to a formula $\text{Score(config)} = \Sigma_1{}^n[(1-c_i) \times u_i]$.

In the formula, Score(config) denotes the score of the deployment manner config, n denotes a total number of all services in the service set, $c_i$ denotes a deployment completion rate of a i-th service, and $u_i$ denotes a contribution rate of a i-th service.

It may be seen that by using the greedy algorithm and comprehensively considering the deployment completion rate and the contribution rate of each service, the score of the deployment manner is determined. As a result, the score of each deployment manner can be determined more accurately.

In some embodiments, the execution subject may determine, in the following manner, whether each service satisfies the target performance in the optimal deployment manner.

Specifically, a first determination step is executed for each service. The first determination step includes steps L1-L2.

Step L1: Whether a throughput of the service in the optimal deployment manner is higher than or equal to a target throughput of the service and whether a delay of the service in the optimal deployment manner is shorter than or equal to a target delay of the service are determined according to actual performance data and target performance data of the service.

In some scenarios, the execution subject may determine sub-GPUs configured to run the service in the optimal deployment manner. The execution subject may further determine throughputs and delays of the service run on the sub-GPUs according to the actual performance data of the service. The execution subject may further determine a target throughput and a target delay of the service according to the target performance data of the service. Further, the total throughput of the service run on all the sub-GPUs may be taken as the throughput of the service in the optimal deployment manner. A total delay of the service run on all the sub-GPUs may be taken as the delay of the service in the optimal deployment manner. As a result, whether the throughput of the service in the optimal deployment manner is higher than or equal to the target throughput of the service is determined, and whether the delay of the service in the optimal deployment manner is shorter than or equal to the target delay of the service is determined.

Step L2: It is determined that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service.

In some embodiments, the first determination step further includes step L3:

Step L3: It is determined that the service fails to satisfy the target performance in the optimal deployment manner in response to determining that the throughput of the service in the optimal deployment manner is lower than the target throughput of the service or the delay of the service in the optimal deployment manner is longer than the target delay of the service.

It may be seen that whether the service satisfies the target performance in the optimal deployment manner is determined by comprehensively considering the throughput and the delay of the service in the optimal deployment manner. Further, the target deployment manner is determined among the optimal deployment manners determined by using the greedy algorithm. Accuracy of determination of the target deployment manner among the optimal deployment manners can be improved.

Figure 4:
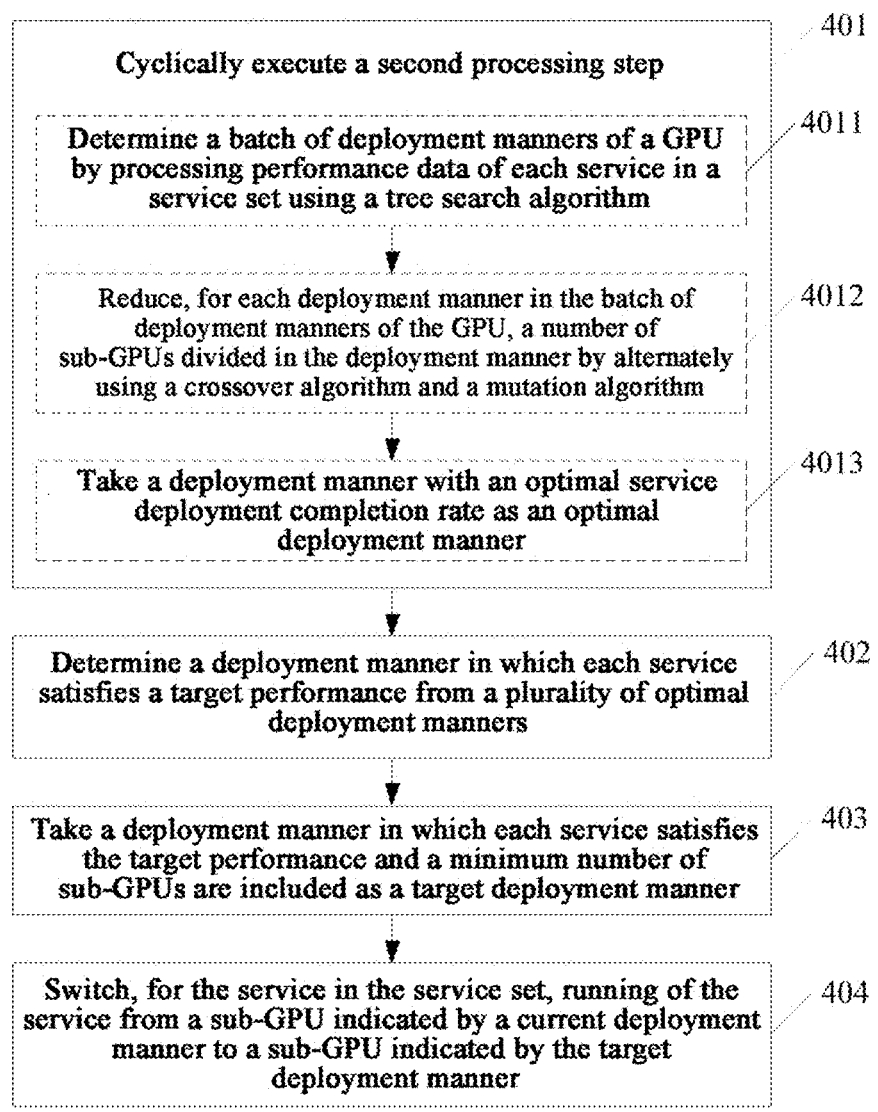
FIG. 4 is a flowchart of a method for running a service according to some embodiments of the disclosure.

With reference to FIG. 4, a flowchart of a method for running a service according to some embodiments of the disclosure is shown. As shown in FIG. 4, the method for running a service includes the following:

Step 401: A second processing step is cyclically executed.

In this embodiment, the execution subject of the method for running a service may cyclically execute the second processing step.

In some scenarios, the execution subject may cyclically execute the second processing step according to preset execution times or execution duration.

The second processing step includes steps 4011-4013.

Step 4011: A batch of deployment manners of a GPU is determined by processing performance data of each service in a service set using tree search algorithm.

The tree search algorithm may enumerate deployment manners of the GPU.

In some scenarios, the execution subject inputs the performance data of each service into the tree search algorithm to obtain the batch of deployment manners output by the tree search algorithm.

Step 4012: For each deployment manner in the batch of deployment manners of the GPU, a number of sub-GPUs divided in the deployment manner is reduced by alternately using a crossover algorithm and a mutation algorithm.

The number of sub-GPUs divided in each deployment manner may be reduced as much as possible by alternately using the crossover algorithm and the mutation algorithm. As a result, the GPU may be divided into as fewer sub-GPUs as possible in each deployment manner.

In some scenarios, the execution subject may reduce the number of sub-GPUs divided in each deployment manner by using the crossover algorithm and the mutation algorithm according to preset execution rounds or execution duration.

Step 4013: A deployment manner that achieves an optimal service deployment completion rate is taken as an optimal deployment manner.

In some scenarios, for each deployment manner, the execution subject may determine the deployment completion rate of each service, and further take the deployment manner in which the deployment completion rate of each service is greater than a preset threshold (for example, 50%) as the optimal deployment manner.

It can be understood that by cyclically executing the second processing step, a plurality of optimal deployment manners may be determined.

Step 402: A deployment manner in which each service satisfies a target performance is determined from a plurality of optimal deployment manners.

Step 403: A deployment manner in which each service satisfies the target performance and a minimum number of sub-GPUs are included is taken as a target deployment manner.

Step 404: For the service in the service set, running of the service is switched from a sub-GPU indicated by a current deployment manner to a sub-GPU indicated by the target deployment manner.

Step 404 is similar to step 102 in the embodiment shown in FIG. 1, and will not be repeated herein.

In this embodiment, the tree search algorithm and a genetic algorithm (the crossover algorithm and the mutation algorithm) are combined for determining the target deployment manner in which the target performance of each service is satisfied and fewer sub-GPUs are included among the enumerated deployment manners. As a result, waste of GPU can be can further reduced by running each service in the target deployment manner.

In some embodiments, the tree search algorithm clips search space in advance. By clipping the search space by the tree search algorithm, a search speed of the tree search algorithm may be improved. As a result, a speed of determination of the target deployment manner by using the tree search algorithm is increased.

In some embodiments, the mutation algorithm is configured to exchange services configured to be run on sub-GPUs of the same size on different GPUs, and the crossover algorithm is configured to change a manner in which a plurality of sub-GPUs on the same GPU run the same service to a manner in which one sub-GPU runs the service.

Figure 5:
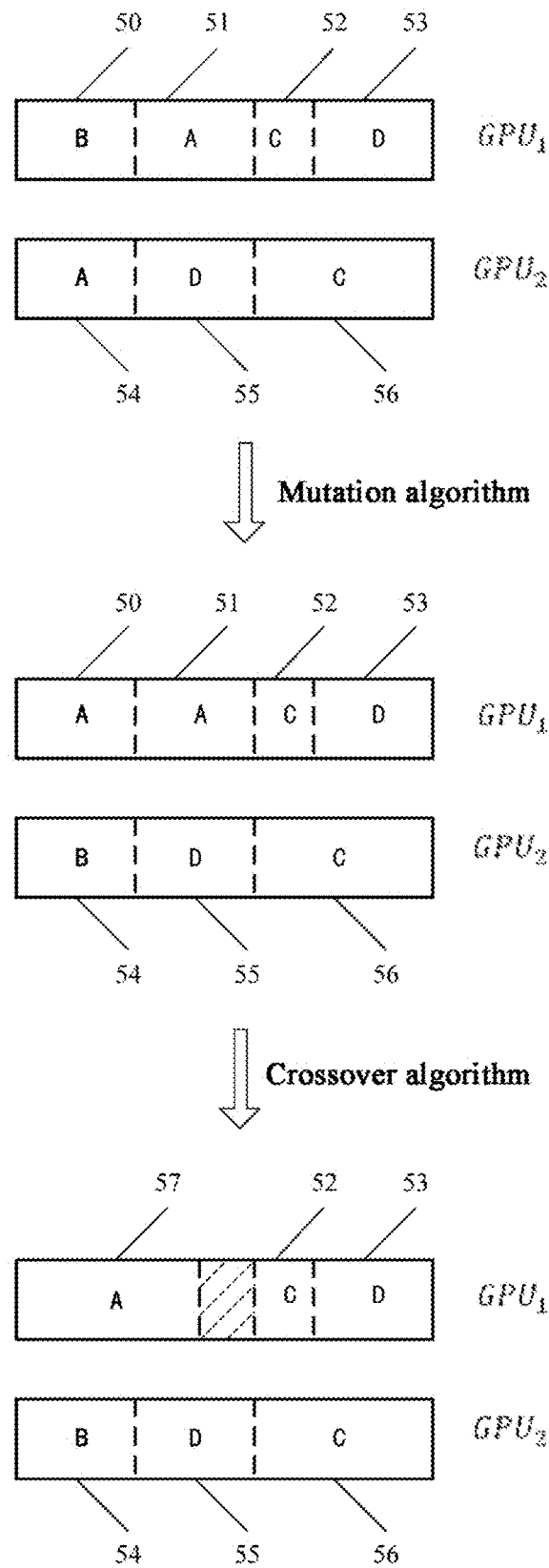
FIG. 5 is a schematic diagram showing use of a crossover algorithm and a mutation algorithm in a method for running a service according to some embodiments of the disclosure.

With reference to FIG. 5, $GPU_1$ includes a sub-GPU 50 of a size of 4/7GPU, and the sub-GPU 50 is configured to run service B. Then, $GPU_2$ includes a sub-GPU 54 of a size of 4/7GPU, and the sub-GPU 54 is configured to run service A. For example, the services configured to be run on the sub-GPU 50 and the sub-GPU 54 may be exchanged by using the mutation algorithm. It may be seen that the sub-GPU 50 is configured to run service A and the sub-GPU 54 is configured to run service B after exchanging the services. For example, by using the crossover algorithm, a manner in which the sub-GPU 50 and the sub-GPU 51 of $GPU_1$ run service A is changed to a manner in which the sub-GPU 57 runs service A on the premise that a performance (for example, a throughput and a delay of service A) jointly achieved by the sub-GPU 50 and the sub-GPU 51 is satisfied. As a result, sub-GPUs of $GPU_1$ may be partially saved, as shown in a shade part in the figure.

It may be seen that the number of sub-GPUs divided in each deployment manner may be reduced as much as possible by alternately using the crossover algorithm and the mutation algorithm.

In some embodiments, the execution subject may determine the deployment manner in which each service satisfies the target performance from a plurality of optimal deployment manners determined by combining the tree search algorithm and the genetic algorithm in the following manner.

First, a second determination step is executed for each service in each optimal deployment manner. The second determination step includes steps T1-T2.

Step T1: Whether a throughput of the service in the optimal deployment manner is higher than or equal to a target throughput of the service and whether a delay of the service in the optimal deployment manner is shorter than or equal to a target delay of the service are determined according to actual performance data and target performance data of the service.

Step T2: It is determined that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service.

In some embodiments, the second determination step further includes step T3.

Step T3: It is determined that the service fails to satisfy the target performance in the optimal deployment manner in response to determining that the throughput of the service in the optimal deployment manner is lower than the target throughput of the service or the delay of the service in the optimal deployment manner is longer than the target delay of the service.

Reference may be made to the foregoing contents for description of steps T1 to T3, which will not be repeated herein.

Step 2: A deployment manner in which each service satisfies a target performance is determined from a plurality of optimal deployment manners.

It may be seen that whether the service satisfies the target performance in the optimal deployment manner is determined by comprehensively considering the throughput and the delay of the service in the optimal deployment manner. Further, the target deployment manner is determined among the optimal deployment manners determined by combining the tree search algorithm and the genetic algorithm. As a result, accuracy and efficiency of determination of the target deployment manner can be improved.

Figure 6:
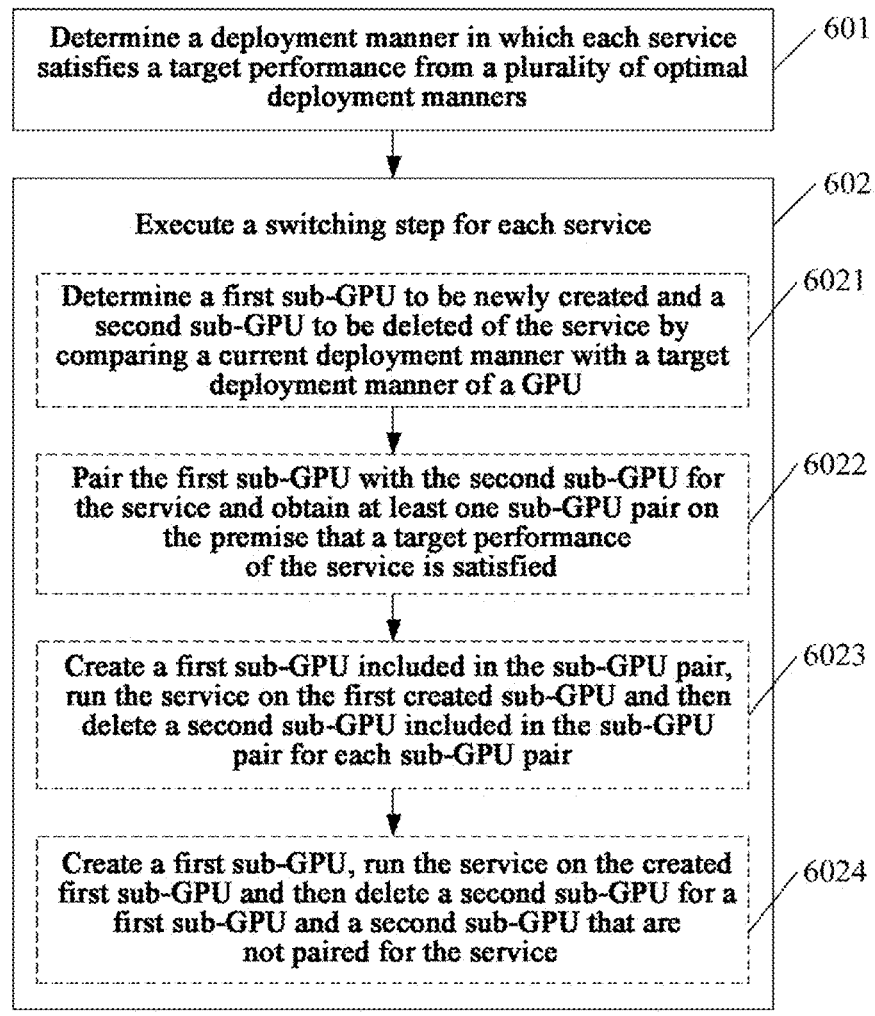
FIG. 6 is a flowchart of a method for running a service according to some embodiments of the disclosure.

With reference to FIG. 6, a flowchart of a method for running a service according to some embodiments of the disclosure is shown. As shown in FIG. 6, the method for running a service includes the following:

Step 601: A target deployment manner of a GPU is determined according to performance data of each service in a service set.

Step 601 is similar to step 101 in the embodiment shown in FIG. 1, and will not be repeated herein.

Step 602: A switching step is executed for each service.

In this embodiment, the execution subject of the method for running a service may execute the switching step for each service in the service set. The switching step includes steps 6021-6024.

Step 6021: A first sub-GPU to be newly created and a second sub-GPU to be deleted of the service are determined by comparing a current deployment manner with a target deployment manner of a GPU.

Specifically, the execution subject determines a missing sub-GPU and a redundant sub-GPU in the current deployment manner by comparing the current deployment manner with the target deployment manner. The missing sub-GPU is taken as the first sub-GPU to be newly created, and the redundant sub-GPU is taken as the second sub-GPU to be deleted.

Step 6022: The first sub-GPU for the service is paired with the second sub-GPU for the service and at least one sub-GPU pair is obtained on the premise that a target performance of the service is satisfied.

In some scenarios, a throughput achieved by the first sub-GPU paired is higher than or equal to a throughput achieved by the second sub-GPU paired. A delay achieved by the first sub-GPU paired is shorter than or equal to a delay achieved by the second sub-GPU paired.

Step 6023: For each sub-GPU pair, a first sub-GPU included in the sub-GPU pair is created, the service is run on the created first sub-GPU and then a second sub-GPU included in the sub-GPU pair is deleted.

It can be understood that at first, the first sub-GPU in the sub-GPU pair is firstly created, and then the second sub-GPU in the sub-GPU pair is deleted, such that the target performance of the service can still be guaranteed in the process of switching the deployment manner. As a result, in the process of switching the deployment manner, the service can be guaranteed to respond to a request of a user normally, so as to guarantee that the request of the user is not affected.

Step 6024: A first sub-GPU is created, the service is run on the created first sub-GPU and then a second sub-GPU is deleted for a first sub-GPU and a second sub-GPU that are not paired for the service.

It can be understood that at first, the first unpaired sub-GPU is created, and then the unpaired second sub-GPU is deleted, such that a request of the user can also be guaranteed to be unaffected in the process of switching the deployment manner.

It can be seen that, in this embodiment, the first sub-GPU to be newly created is first created and then the second sub-GPU to be deleted is deleted for each service. As a result, in the process of switching to the target deployment manner, a normal operation of each service is guaranteed. In addition, by pairing the first sub-GPU with the second sub-GPU, the target deployment manners can be smoothly switched.

Figure 7:
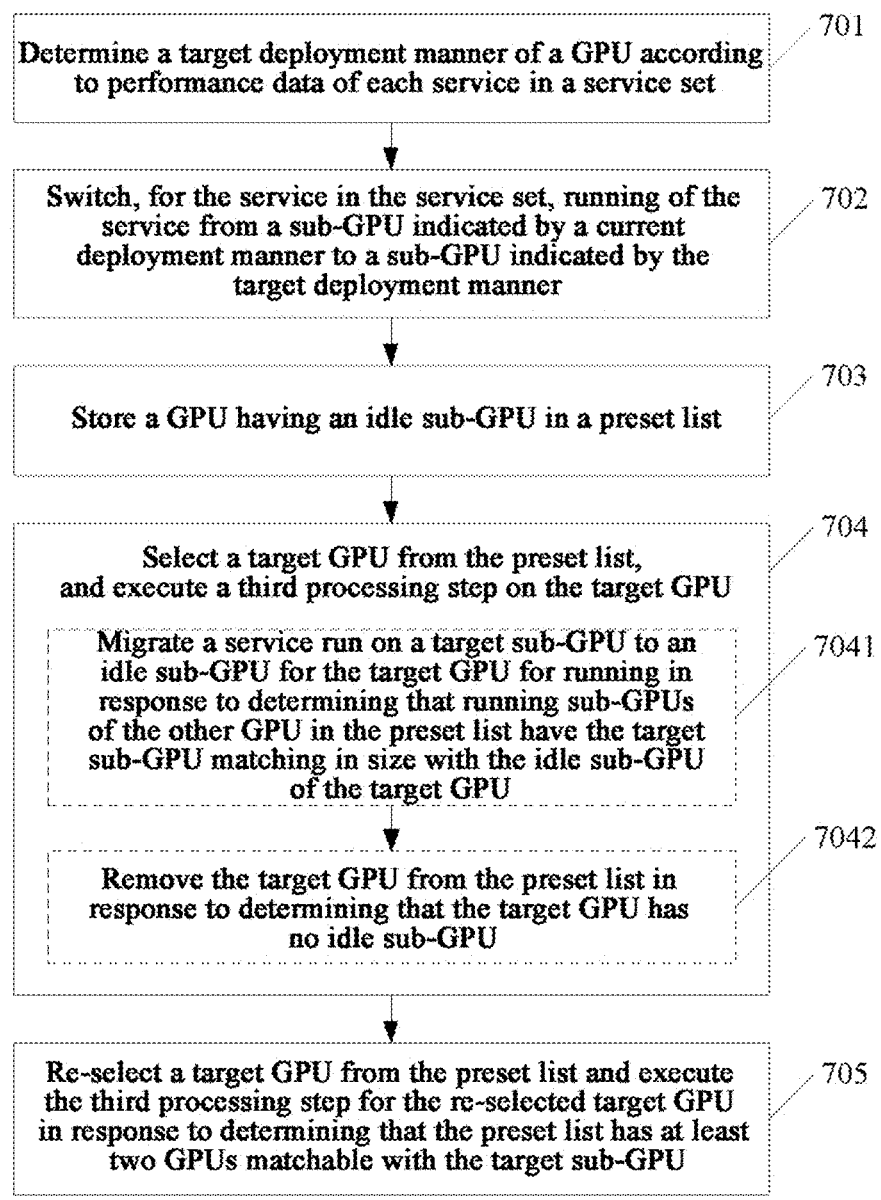
FIG. 7 is a flowchart of a method for running a service according to some embodiments of the disclosure.

With reference to FIG. 7, a flowchart of a method for running a service according to some embodiments of the disclosure is shown. As shown in FIG. 7, the method for running a service includes the following:

Step 701: A target deployment manner of a GPU is determined according to performance data of each service in a service set.

Step 702: For the service in the service set, running of the service is switched from a sub-GPU indicated by a current deployment manner to a sub-GPU indicated by the target deployment manner.

Steps 701-702 are similar to steps 101-102 in the embodiment shown in FIG. 1, and will not be repeated herein.

Step 703: A GPU having an idle sub-GPU is stored in a preset list.

It may be understood that the idle sub-GPU may be a sub-GPU that does not run the service.

Step 704: A target GPU is selected from the preset list, and a third processing step is executed for the target GPU.

In this embodiment, the execution subject of the method for running a service may execute the third processing step for the target GPU. The third processing step includes steps 7041-7042.

Step 7041: A service run on a target sub-GPU is migrated to an idle sub-GPU of the target GPU for running in response to determining that running sub-GPUs of the other GPU in the preset list have the target sub-GPU matching in size with the idle sub-GPU of the target GPU.

The running sub-GPU may be a sub-GPU that runs the service.

It may be understood that after being migrated, the service run on the target sub-GPU is run on the idle sub-GPU of the target GPU.

Step 7042: The target GPU is removed from the preset list in response to determining that the target GPU includes no idle sub-GPU.

It may be understood that if the target GPU includes no idle sub-GPU, it means that the target GPU is fully occupied by the service.

Step 705: A target GPU is re-selected from the preset list and the third processing step is executed for the re-selected target GPU in response to determining that the preset list has at least two GPUs matchable with the target sub-GPU.

It may be seen that in this embodiment, for the target GPU having the idle sub-GPU, some target GPUs may be fully occupied by migrating the service to the idle sub-GPUs, thereby reducing the number of GPUs occupied by the service. As a result, effective utilization of GPU can be implemented.

In some embodiments, the execution subject may migrate, in the following manner, the service run on the matching sub-GPU to the idle sub-GPU of the target GPU for running.

Specifically, a service run on a target sub-GPU of a device where the target GPU is located is preferentially migrated to the idle sub-GPU of the target GPU for running.

It may be understood that by preferentially migrating services on the same device can shorten time and reduce cost required for service migration.

Figure 8:
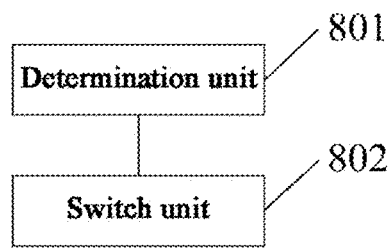
FIG. 8 is a schematic structural diagram of an apparatus for running a service according to some embodiments of the disclosure.

Further with reference to FIG. 8, as an implementation of the methods shown in the above figures, the disclosure provides some embodiments of an apparatus for running a service. The apparatus embodiment corresponds to the method embodiment shown in FIG. 1, and the apparatus can be specifically applied to various electronic devices.

As shown in FIG. 8, the apparatus for running a service of this embodiment includes a determination unit 801 and a switch unit 802. The determination unit 801 is configured to determine a target deployment manner of a GPU according to performance data of each service in a service set, where the deployment manner includes: dividing the GPU into sub-GPUs of a respective size and determining a service configured to be run by each sub-GPU. The switch unit 802 is configured to switch, for the service in the service set, running of the service from a sub-GPU indicated by a current deployment manner to a sub-GPU indicated by the target deployment manner.

In this embodiment, reference may be made to related description of steps 101 and 102 in a corresponding embodiment of FIG. 1 respectively for specific processing of the determination unit 801 and the switch unit 802 of the apparatus for running a service and technical effects brought by the determination unit and the switch unit, which will not be repeated herein.

In some embodiments, the performance data of the service include actual performance data and target performance data, the actual performance data includes throughputs and delays that are achieved by the service run on sub-GPUs of different sizes, and the target performance data includes a target throughput and a target delay of the service.

In some embodiments, the determination unit 801 is further configured to execute a first processing step: determining an optimal deployment manner of the GPU by processing the performance data of each service in the service set a greedy algorithm; determining, for each service, whether the service satisfies a target performance in the optimal deployment manner according to the performance data of the service; and taking the optimal deployment manner as the target deployment manner in response to determining that each service satisfies the target performance in the optimal deployment manner. The determination unit 801 is further configured to continue to execute the first processing step in response to determining that any service in the service set fails to satisfy the target performance in the optimal deployment manner.

In some embodiments, the determination unit 801 is further configured to determine a batch of deployment manners of the GPU by processing the performance data of each service in the service set, score each deployment manner, and take a deployment manner with the highest score as the optimal deployment manner.

In some embodiments, the determination unit 801 is further configured to execute a scoring step on each deployment manner: determine, for each service, a deployment completion rate and a contribution rate of the service according to the actual performance data and the target performance data of the service, where the deployment completion rate denotes the ratio of a throughput in a certain deployment manner to a target throughput of the service, and the contribution rate denotes the ratio of the throughput of the service in a certain deployment manner to a total target throughput of all services. The determination unit 801 is configured to determine the score of the deployment manner according to a formula Score(config)=$\Sigma_1^n[(1-c_i) \times u_i]$, where Score(config) denotes the score of the deployment manner config, n denotes a total number of all services in the service set, $c_i$ denotes a deployment completion rate of a i-th service, and $u_i$ denotes a contribution rate of a i-th service.

In some embodiments, the determination unit 801 is further configured to execute a first determination step for each service in each optimal deployment manner: determining whether a throughput of the service in the optimal deployment manner is higher than or equal to a target throughput of the service and whether a delay of the service in the optimal deployment manner is shorter than or equal to a target delay of the service according to actual performance data and target performance data of the service; and determining that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service.

In some embodiments, the first determination step further includes: it is determined that the service fails to satisfy the target performance in the optimal deployment manner in response to determining that the throughput of the service in the optimal deployment manner is lower than the target throughput of the service or the delay of the service in the optimal deployment manner is longer than the target delay of the service.

In some embodiments, the determination unit 801 is further configured to: cyclically execute a second processing step: determine a batch of deployment manners of the GPU by processing the performance data of each service in the service set using a tree search algorithm; reduce, for each deployment manner in the batch of deployment manners of the GPU, a number of sub-GPUs divided in the deployment manner by alternately using a crossover algorithm and a mutation algorithm; take a deployment manner with an optimal service deployment completion rate as an optimal deployment manner; determine a deployment manner in which each service satisfies a target performance from a plurality of optimal deployment manners; and take a deployment manner in which each service satisfies the target performance and a minimum number of sub-GPUs are included as a target deployment manner.

In some embodiments, the mutation algorithm is configured to exchange services configured to be run by sub-GPUs of the same size on different GPUs, and the crossover algorithm is configured to change a manner in which a plurality of sub-GPUs on the same GPU run the same service to a manner in which one sub-GPU runs the service.

In some embodiments, the determination unit 801 is further configured to execute a second determination step for each service in each optimal deployment manner: determining whether a throughput of the service in the optimal deployment manner is higher than or equal to a target throughput of the service and whether a delay of the service in the optimal deployment manner is shorter than or equal to a target delay of the service according to actual performance data and target performance data of the service, determining that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service; and determine a deployment manner in which each service satisfies a target performance among a preset number of optimal deployment manners.

In some embodiments, the second determination step further includes: determining that the service fails to satisfy the target performance in the optimal deployment manner in response to determining that the throughput of the service in the optimal deployment manner is lower than the target throughput of the service or the delay of the service in the optimal deployment manner is longer than the target delay of the service.

In some embodiments, the tree search algorithm clips search space in advance.

In some embodiments, the switch unit 802 is further configured to execute a switching step for each service: determining, for each service, a first sub-GPU to be newly created and a second sub-GPU to be deleted of the service by comparing a current deployment manner with a target deployment manner of a GPU; pairing the first sub-GPU with the second sub-GPU for the service and obtaining at least one sub-GPU pair on the premise that a target performance of the service is satisfied; creating a first sub-GPU included in the sub-GPU pair, running the service on the created first sub-GPU and then deleting a second sub-GPU included in the sub-GPU pair for each sub-GPU pair; and create a first sub-GPU, run the service on the created first sub-GPU and then delete a second sub-GPU for a first sub-GPU and a second sub-GPU that are not paired for the service.

In some embodiments, the apparatus for running a service may further include an execution unit (not shown in the figure). The execution unit is configured to store a GPU having an idle sub-GPU in a preset list, select a target GPU from the preset list, and execute a third processing step for the target GPU: migrate a service run on a target sub-GPU to an idle sub-GPU of the target GPU for running in response to determining that running sub-GPUs of the other GPU in the preset list having the target sub-GPU matching in size with the idle sub-GPU of the target GPU, and remove the target GPU from the preset list in response to determining that the target GPU has no idle sub-GPU.

The execution unit is configured to re-select a target GPU from the preset list and execute the third processing step for the re-selected target GPU in response to determining that the preset list has at least two GPUs matchable with the target sub-GPU.

In some embodiments, a service run on a target sub-GPU of a device where the target GPU is located preferentially migrated to the idle sub-GPU of the target GPU to be run.

Figure 9:
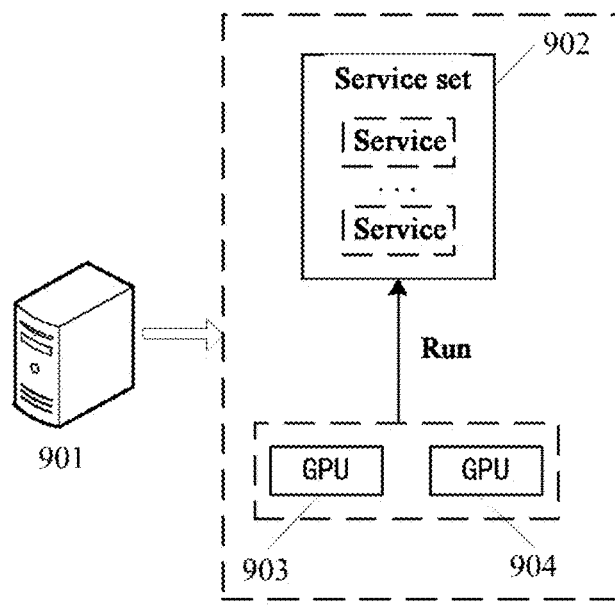
FIG. 9 is an illustrative system architecture to which a method for running a service is applied according to some embodiments of the disclosure.

Further, with reference to FIG. 9, FIG. 9 shows an illustrative system architecture to which a method for running a service is applied according to some embodiments of the disclosure.

As shown in FIG. 9, the system architecture may include a server 901, a service set 902, a GPU 903 and a GPU 904. The service set includes at least one service.

The server 901 may run each service in the service set 902 through the GPU 903 and the GPU 904. In some scenarios, the server 901 may determine a target deployment manner of a GPU according to performance data of each service in the service set 902. Further, for the service in the service set 902, the server 901 may switch running of the service from the sub-GPU indicated by a current deployment manner to a sub-GPU indicated by the target deployment manner.

It should be noted that the GPU 903 and the GPU 904 may be set in the same device or in different devices.

The server 901 may be hardware or software. When the server 901 is the hardware, a distributed server cluster composed of a plurality of servers or as a single server may be selected as the server. When the server 901 is the software, a plurality of pieces of software or software modules (for example, a plurality of pieces of software or software modules for providing distributed services) or as a single piece of software or software module may be selected as the server, which is not specifically limited herein.

It should be noted that the method for running a service provided by the embodiment of the disclosure may be executed by the server 901, and the apparatus for running a service may be mounted in the server 901 accordingly.

It should be understood that numbers of the servers, the service sets and the GPUs in FIG. 9 are merely illustrative. Any number of servers, service sets and GPUs may be provided according to implementation needs.

Figure 10:
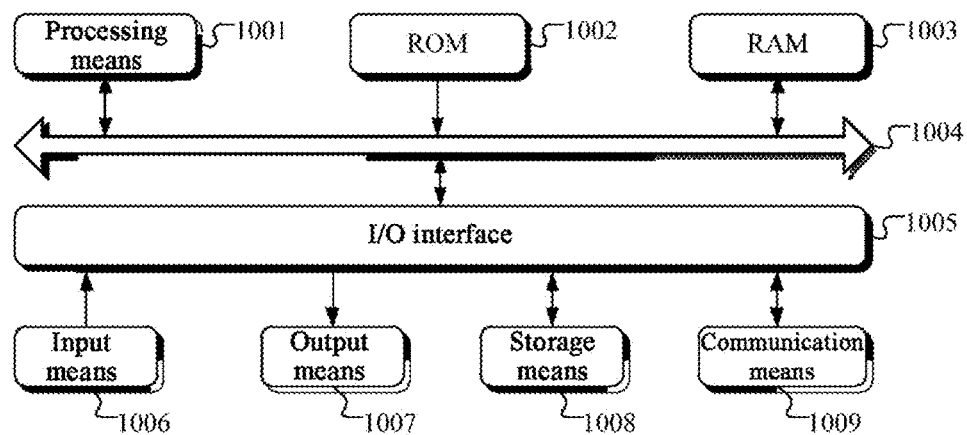
FIG. 10 is a schematic diagram of a basic structure of an electronic device according to some embodiments of the disclosure.

With reference to FIG. 10, a schematic structural diagram of an electronic device (for example, a server in FIG. 9) applied to implementation of some embodiments of the disclosure is shown. The electronic device shown in FIG. 10 is merely an instance, and should not be constructed as limitation to functions and application scopes of the embodiment of the disclosure. The electronic device shown in FIG. 10 is merely an instance, and should not be constructed as any limitation to functions and application scopes of the embodiment of the disclosure.

As shown in FIG. 10, the electronic device may include a processing means 1001 (for example, a central processing unit, a graphics processing unit, etc.), which may execute various appropriate actions and processing according to a program stored in a read-only memory (ROM) 1002 or loaded from a storage means 1008 to a random access memory (RAM) 1003. The RAM 1003 may further store various programs and data required for the operation of the electronic device. The processing means 1001, the ROM 1002, and the RAM 1003 are connected to one another through a bus 1004. An input/output (I/O) interface 1005 is also connected to the bus 1004.

Generally, the following means may be connected to the I/O interface 1005: an input means 1006 including, for example, a touch screen, a touch pad, a keyboard, a mouse, a camera, a microphone, an accelerometer, a gyroscope, etc., an output apparatus 1007 including, for example, a liquid crystal display (LCD), a speaker, a vibrator, etc., the storage apparatus 1008 including, for example, a magnetic tape, a hard disk, etc., and a communication means 1009. The communication means 1009 may allow the electronic device to be in wireless or wired communication with other devices for data exchange. Although the electronic device having various apparatuses is shown in FIG. 10, it should be understood that it is not required to implement or provide all the devices shown. More or fewer means may alternatively be implemented or provided. Each block shown in FIG. 10 may represent one apparatus or a plurality of apparatuses as required.

In particular, according to some embodiments of the disclosure, a process described above with reference to the flowchart may be implemented as a computer software program. For example, some embodiments of the disclosure include a computer program product that includes a computer program carried on a non-transient computer-readable medium, and the computer program includes program codes for executing the method shown in the flowchart. In such an embodiment, the computer program may be downloaded and mounted from the network through the communication means 1009, or mounted from the storage means 1008, or mounted from the ROM 1002. When executed by the processing means 1001, the computer program executes the above functions defined in the method of the embodiment of the disclosure.

It should be noted that the computer-readable medium described above in some embodiments of the disclosure may be a computer-readable signal medium or a computer-readable storage medium or any one of their combinations. For example, the computer-readable storage medium may include, but is not limited to, an electric, magnetic, optical, electromagnetic, infrared, or semiconductor system, apparatus or device, or any one of their combinations. More specific instances of the computer-readable storage medium may include, but not limited to, an electrical connection having one or more wires, a portable computer disk, a hard disk, a random access memory (RAM), a read-only memory (ROM), an erasable programmable read-only memory (EPROM or a ash memory), an optical fiber, a portable compact disk read-only memory (CD-ROM), an optical storage device, a magnetic storage device, or their any suitable combination. In some embodiments of the disclosure, the computer-readable storage medium may be any tangible medium including or storing a program, and the program may be used by or in combination with an instruction execution system, apparatus or device. In some embodiments of the disclosure, the computer-readable signal medium may include a data signal propagated in a baseband or as part of a carrier wave, in which a computer-readable program code is carried. This propagated data signal may have many forms, including but not limited to an electromagnetic signal, an optical signal or their any suitable combination. The computer-readable signal medium may further be any computer-readable medium other than the computer-readable storage medium, and the computer-readable medium may send, propagate or transmit a program used by or in combination with the instruction execution system, apparatus or device. A program code included in the computer-readable medium may be transmitted by any suitable medium, including but not limited to: a wire, an optical cable, a radio frequency (RF) medium, etc., or their any suitable combination.

In some embodiments, a client side and a server may communicate by using any currently known or future developed network protocol such as the hyper text transfer protocol (HTTP), and may be interconnected with digital data communication in any form or medium (for example, a communication network). Instances of the communication network include a local area network ("LAN"), a wide area network ("WAN"), internet work (for example, the Internet), an end-to-end network (for example, ad hoc end-to-end network), and any currently known or future developed network.

The computer-readable medium may be included in the electronic device, or exist independently without being fitted into the electronic device. The computer-readable medium carries one or more programs. When the one or more programs are executed by the electronic device, the electronic device is caused to determine a target deployment manner of a GPU according to performance data of each service in a service set, where the deployment manner includes: the GPU is divided into sub-GPUs of a respective size and a service configured to be run by each sub-GPU is determined; and for the service in the service set, running of the service is switched from a sub-GPU indicated by a current deployment manner to a sub-GPU indicated by the target deployment manner.

Computer program codes for executing the operations of some embodiments of the disclosure may be written in one or more programming languages or their combinations, and the programming languages include, but are not limited to, object-oriented programming languages such as Java, Smalltalk. C++, and further include conventional procedural programming languages such as "C" language or similar programming languages. The program codes may be completely executed on a computer of the user, partially executed on the computer of the user, executed as an independent software package, partially executed on the computer of the user and a remote computer separately, or completely executed on the remote computer or the server. In the case of involving the remote computer, the remote computer may be connected to the computer of the user through any kind of network, including a local area network (LAN) or a wide area network (WAN), or may be connected to an external computer (for example, through the Internet provided by an Internet service provider).

The flowcharts and block diagrams in the accompanying drawings illustrate the architectures, functions and operations that may be implemented by the systems, the methods and the computer program products according to various embodiments of the disclosure. In this regard, each block in the flowchart or block diagram may represent a module, a program segment, or a part of a code that includes one or more executable instructions for implementing specified logical functions. It should also be noted that in some alternative implementations, the functions noted in the blocks may occur in an order different than those noted in the accompanying drawings. For example, two blocks represented in succession may actually be executed in substantially parallel, and may sometimes be executed in a reverse order depending on the functions involved. It should also be noted that each block in the block diagram and/or flowchart, and a combination of blocks in the block diagram and/or flowchart may be implemented by a specific hardware-based system that executes specified functions or operations, or may be implemented by a combination of specific hardware and computer instructions.

The units described in some embodiments of the disclosure may be implemented by software or hardware. The names of these units do not construct limitation to the units in some cases. For example, the determination unit may also be described as a unit that is configured to "determine a target deployment manner of a GPU according to performance data of each service in a service set".

The functions described above herein may be executed at least in part by one or more hardware logic components. For example, without limitation, illustrative kinds of hardware logic components that may be used include: a field programmable gate array (FPGA), an application specific integrated circuit (ASIC), an application specific standard product (ASSP), a system on chip (SOC), a complex programmable logic device (CPLD), etc.

In the context of the disclosure, a machine-readable medium may be a tangible medium, and may include or store a program that is used by or in combination with the instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or their any suitable combination. More specific embodiments of the machine-readable storage medium may include an electrical connection based on one or more wires, a portable computer disk, a hard disk, a random access memory (RAM), a read-only memory (ROM), an erasable programmable read-only memory (EPROM) or a flash memory, an optical fiber, a portable compact disk read-only memory (CD-ROM), an optical storage device, a magnetic storage device, or their any suitable combination.

The embodiments described above are merely some preferred embodiments of the disclosure and description of applied technical principles. It should be understood by those skilled in the art that the disclosed scope involved in the embodiment of the disclosure is not limited to the technical solution formed by a specific combination of the above technical features, but should further cover other technical solution formed by any combination of the above technical features or their equivalent features without departing from the above concepts of the disclosure, for example, a technical solution is formed by interchanging the above features and (non-limitative) technical features having similar functions as disclosed in the disclosure.

In addition, although the operations are depicted in a particular order, such a depiction should not be understood as a requirement that these operations be executed in the particular order shown or in a sequential order. In certain circumstances, multitasking and parallel processing may be favourable. Similarly, although several specific implementation details are included in the above discussion, these details should not be construed as limitation to the scope of the disclosure. Some features described in the context of a separate embodiment can be further implemented in a single embodiment in a combination manner. On the contrary, various features described in the context of a single embodiment can further be implemented in a plurality of embodiments separately or in any suitable sub-combination manner.

Although the subject matter has been described in language specific to structural features and/or methodological logical acts, it should be understood that the subject matter defined in the appended claims is not necessarily limited to the specific features or actions described above. On the contrary, the specific features and actions described above are merely illustrative implementation forms of the claims.

The invention claimed is:

1. A method for running a service, comprising:
   determining a target deployment manner of a graphics processing unit (GPU) according to performance data of each service in a service set, wherein the deployment manner comprises: dividing the GPU into sub-GPUs of a respective size and determining a service configured to be run by each sub-GPU; and
   switching, for the service in the service set, running of the service from a sub-GPU indicated by a current deployment manner to a sub-GPU indicated by the target deployment manner, the switching comprising:
   executing a switching step for each service:
      determining, for the service, a first sub-GPU to be newly created and a second sub-GPU to be deleted by comparing the current deployment manner with the target deployment manner of the GPU;
      pairing the first sub-GPU with the second sub-GPU for the service and obtaining at least one sub-GPU pair on the premise that a target performance of the service is satisfied;
      creating the first sub-GPU comprised in the sub-GPU pair, running the service on the created first sub-GPU and then deleting the second sub-GPU comprised in the sub-GPU pair for each sub-GPU pair; and
      creating a first sub-GPU, running the service on the created first sub-GPU and then deleting a second sub-GPU, for a first sub-GPU and a second sub-GPU that are not paired for the service.

2. The method according to claim 1, wherein the performance data of the service comprises actual performance data and target performance data, wherein the actual performance data comprises throughputs and delays that are achieved by the service run on sub-GPUs of different sizes, and the target performance data comprises a target throughput and a target delay of the service.

3. The method according to claim 1, wherein determining the target deployment manner of the GPU according to the performance data of each service in the service set comprises:
   executing a first processing step: determining an optimal deployment manner of the GPU by processing the performance data of each service in the service set using a greedy algorithm; determining, for each service, whether the service satisfies a target performance in the optimal deployment manner according to the performance data of the service; and taking the optimal deployment manner as the target deployment manner in response to determining that each service satisfies the target performance in the optimal deployment manner; and
   continuing to execute the first processing step in response to determining that any service in the service set fails to satisfy the target performance in the optimal deployment manner.

4. The method according to claim 3, wherein determining the optimal deployment manner of the GPU by processing the performance data of each service in the service set comprises:
   determining a batch of deployment manners of the GPU by processing the performance data of each service in the service set, determining a score of each deployment manner, and taking a deployment manner with the highest score as the optimal deployment manner.

5. The method according to claim 3, wherein determining, for each service, whether the service satisfies the target performance in the optimal deployment manner according to the performance data of the service comprises:
   executing a first determination step for each service:
   determining whether a throughput of the service in the optimal deployment manner is higher than or equal to a target throughput of the service and whether a delay of the service in the optimal deployment manner is shorter than or equal to a target delay of the service according to actual performance data and target performance data of the service; and
   determining that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service.

6. The method according to claim 5, wherein the first determination step further comprises:
   determining that the service fails to satisfy the target performance in the optimal deployment manner in response to determining that the throughput of the service in the optimal deployment manner is lower than the target throughput of the service or the delay of the service in the optimal deployment manner is longer than the target delay of the service.

7. The method according to claim 1, wherein determining the target deployment manner of the GPU according to the performance data of each service in the service set comprises:
cyclically executing a second processing step: determining a batch of deployment manners of the GPU by processing the performance data of each service in the service set using a tree search algorithm; reducing, for each deployment manner in the batch of deployment manners of the GPU, a number of sub-GPUs divided in the deployment manner by alternately using a crossover algorithm and a mutation algorithm; and taking a deployment manner with an optimal service deployment completion rate as an optimal deployment manner;
determining a deployment manner in which each service satisfies a target performance from a plurality of optimal deployment manners; and
taking a deployment manner in which each service satisfies the target performance and a minimum number of sub-GPUs are comprised as the target deployment manner.

8. The method according to claim 7, wherein the mutation algorithm is configured to exchange services configured to be run by sub-GPUs of a same size on different GPUs, and the crossover algorithm is configured to change a manner in which a plurality of sub-GPUs on a same GPU run a same service to a manner in which one sub-GPU runs the service.

9. The method according to claim 7, wherein determining the deployment manner in which each service satisfies the target performance from the plurality of optimal deployment manners comprises:
executing a second determination step for each service in each optimal deployment manner: determining whether a throughput of the service in the optimal deployment manner is higher than or equal to a target throughput of the service and whether a delay of the service in the optimal deployment manner is shorter than or equal to a target delay of the service according to actual performance data and target performance data of the service; and determining that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service; and
determining a deployment manner in which each service satisfies the target performance from the plurality of optimal deployment manners.

10. The method according to claim 9, wherein the second determination step further comprises:
determining that the service fails to satisfy the target performance in the optimal deployment manner in response to determining that the throughput of the service in the optimal deployment manner is lower than the target throughput of the service or the delay of the service in the optimal deployment manner is longer than the target delay of the service.

11. The method according to claim 7, wherein the tree search algorithm clips a search space in advance.

12. The method according to claim 1, further comprising:
storing a GPU having an idle sub-GPU in a preset list;
selecting a target GPU from the preset list, and executing a third processing step for the target GPU: migrating a service run on a target sub-GPU to an idle sub-GPU of the target GPU for running in response to determining that running sub-GPUs of the other GPU in the preset list have the target sub-GPU matching in size with the idle sub-GPU of the target GPU, and removing the target GPU from the preset list in response to determining that the target GPU has no idle sub-GPU; and
re-selecting a target GPU from the preset list and executing the third processing step for the re-selected target GPU in response to determining that the preset list has at least two GPUs matchable with the target sub-GPU.

13. The method according to claim 12, wherein migrating the service run on the target sub-GPU to the idle sub-GPU of the target GPU for running comprises:
preferentially migrating a service run on a target sub-GPU of a device where the target GPU is located to the idle sub-GPU of the target GPU for running.

14. An electronic device, comprising:
one or more processors; and
a storage means configured to store one or more programs, wherein
the one or more programs, when executed by the one or more processors, are configured to:
determine a target deployment manner of a graphics processing unit (GPU) according to performance data of each service in a service set, wherein the deployment manner comprises: dividing the GPU into sub-GPUs of a respective size and determining a service configured to be run by each sub-GPU; and
switch, for the service in the service set, running of the service from a sub-GPU indicated by a current deployment manner to a sub-GPU indicated by the target deployment manner, by being configured to:
execute a switching step for each service:
determine, for the service, a first sub-GPU to be newly created and a second sub-GPU to be deleted by comparing the current deployment manner with the target deployment manner of the GPU;
pair the first sub-GPU with the second sub-GPU for the service and obtaining at least one sub-GPU pair on the premise that a target performance of the service is satisfied;
create the first sub-GPU comprised in the sub-GPU pair, running the service on the created first sub-GPU and then deleting the second sub-GPU comprised in the sub-GPU pair for each sub-GPU pair; and
create a first sub-GPU, running the service on the created first sub-GPU and then deleting a second sub-GPU, for a first sub-GPU and a second sub-GPU that are not paired for the service.

15. The electronic device according to claim 14, wherein the performance data of the service comprises actual performance data and target performance data, wherein the actual performance data comprises throughputs and delays that are achieved by the service run on sub-GPUs of different sizes, and the target performance data comprises a target throughput and a target delay of the service.

16. The electronic device according to claim 14, wherein the one or more processors are configured to determine the target deployment manner of the GPU according to the performance data of each service in the service set by being configured to:

execute a first processing step: determine an optimal deployment manner of the GPU by processing the performance data of each service in the service set using a greedy algorithm; determine, for each service, whether the service satisfies a target performance in the optimal deployment manner according to the performance data of the service; and take the optimal deployment manner as the target deployment manner in response to determining that each service satisfies the target performance in the optimal deployment manner; and continue to execute the first processing step in response to determining that any service in the service set fails to satisfy the target performance in the optimal deployment manner.

17. The electronic device according to claim 16, wherein the one or more processors are configured to determine the optimal deployment manner of the GPU by processing the performance data of each service in the service set by being configured to:

determine a batch of deployment manners of the GPU by processing the performance data of each service in the service set, determine a score of each deployment manner, and take a deployment manner with the highest score as the optimal deployment manner.

18. The electronic device according to claim 16, wherein the one or more processors are configured to determine, for each service, whether the service satisfies the target performance in the optimal deployment manner according to the performance data of the service by being configured to:

execute a first determination step for each service:

determine whether a throughput of the service in the optimal deployment manner is higher than or equal to a target throughput of the service and whether a delay of the service in the optimal deployment manner is shorter than or equal to a target delay of the service according to actual performance data and target performance data of the service; and determine that the service satisfies the target performance in the optimal deployment manner in response to determining that the throughput of the service in the optimal deployment manner is higher than or equal to the target throughput of the service and the delay of the service in the optimal deployment manner is shorter than or equal to the target delay of the service.

19. A non-transient computer-readable medium, storing a computer program thereon, wherein the program, when executed by a processor, implements:

determining a target deployment manner of a graphics processing unit (GPU) according to performance data of each service in a service set, wherein the deployment manner comprises: dividing the GPU into sub-GPUs of a respective size and determining a service configured to be run by each sub-GPU; and switching, for the service in the service set, running of the service from a sub-GPU indicated by a current deployment manner to a sub-GPU indicated by the target deployment manner, the switching comprising:

executing a switching step for each service:

determining, for the service, a first sub-GPU to be newly created and a second sub-GPU to be deleted by comparing the current deployment manner with the target deployment manner of the GPU;

pairing the first sub-GPU with the second sub-GPU for the service and obtaining at least one sub-GPU pair on the premise that a target performance of the service is satisfied;

creating the first sub-GPU comprised in the sub-GPU pair, running the service on the created first sub-GPU and then deleting the second sub-GPU comprised in the sub-GPU pair for each sub-GPU pair; and creating a first sub-GPU, running the service on the created first sub-GPU and then deleting a second sub-GPU, for a first sub-GPU and a second sub-GPU that are not paired for the service.

* * * * *